United States Patent [19]

Chenevard et al.

[11] 4,050,574
[45] Sept. 27, 1977

[54] DEVICE FOR TRANSFERRING PRODUCTS BETWEEN MOULDS OF A PRODUCTION MACHINE AND A TABLE OF A WRAPPING MACHINE

[75] Inventors: Alexis Chenevard, Morges; Jean Torres, Lausanne, both of Switzerland

[73] Assignee: SAPAL Societe Anonyme des Plieuses Automatiques, France

[21] Appl. No.: 696,287

[22] Filed: June 15, 1976

[30] Foreign Application Priority Data

July 30, 1975 Switzerland ................... 9954/75

[51] Int. Cl.² .................................... B65G 47/08
[52] U.S. Cl. ................................. 198/458; 198/404; 198/408; 198/480; 198/689; 214/1 BV; 271/196
[58] Field of Search ............... 198/403, 404, 408, 428, 198/458, 478, 480, 689; 214/1 BS, 1 BV; 271/92, 95, 196, 276

[56] References Cited

U.S. PATENT DOCUMENTS

| | | | |
|---|---|---|---|
| 2,086,577 | 7/1937 | Reinartz | 271/92 |
| 2,936,681 | 5/1960 | Earp | 271/95 X |
| 3,272,360 | 9/1966 | Van der Schoot | 214/1 BV |
| 3,469,670 | 9/1969 | Cartwright | 198/478 |
| 3,580,442 | 5/1971 | Rohdin et al. | 198/458 X |
| 3,599,541 | 8/1971 | Allen | 271/95 X |
| 3,777,453 | 12/1973 | Zimmermann et al. | 198/404 |
| 3,836,139 | 9/1974 | Schimizu | 271/95 |

*Primary Examiner*—Evon C. Blunk
*Assistant Examiner*—Richard K. Thomson
*Attorney, Agent, or Firm*—Stevens, Davis, Miller & Mosher

[57] ABSTRACT

A device for transferring rows of products from moulds to a delivering table while turning over and setting the spacing of the products during transfer comprises telescopic assemblies of suction-cup supports mounted on diametrically opposed tubular arms rotatable on a fixed suction pipe with which the suction cups communicate. The angular position of the suction-cup supports relative to the arms is controlled during rotation to facilitate unmoulding of the products, and the spacing of the suction-cup supports is set, by a sliding sun-and-planet pinion arrangement controlled by two cam systems.

3 Claims, 6 Drawing Figures

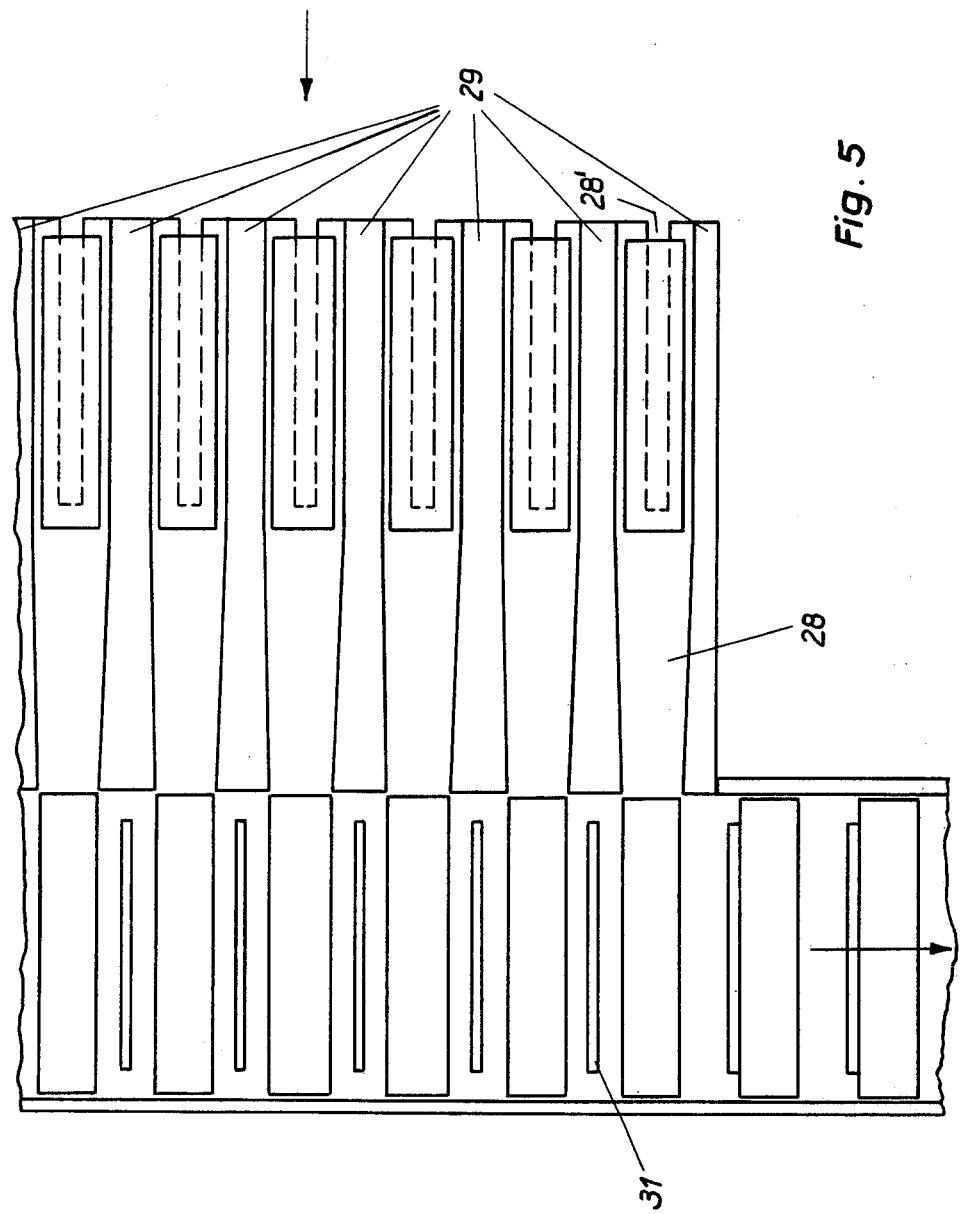

DEVICE FOR TRANSFERRING PRODUCTS BETWEEN MOULDS OF A PRODUCTION MACHINE AND A TABLE OF A WRAPPING MACHINE

The invention concerns devices for transferring products, such as bars or sticks of chocolate, from moulds of a production machine to a table of a wrapping machine or a grouping plate, while turning over the products during transfer, of the type comprising suction cups mounted on movable tubular supports connected to a suction pipe.

Devices of this type are known comprising two conveyors disposed in the same horizontal plane and two suction-cup supports disposed symmetrically in relation to a median vertical plane between these conveyors one of which carries moulds containing bars of chocolate and the other carries means for wrapping the bars of chocolate. These suction-cup supports are moved simultaneously in a manner to alternatively bring the cups either into a horizontal position above the conveyors, or a common vertical position in which the bars of chocolate are engaged between the cups of the two supports. A mechanism is provided for controlling an oscillating movement of the suction-cup supports and a pneumatic device is arranged in such a manner that when the suction-cup supports are in the vertical position the bars of chocolate are transferred from the support which had lifted them out of the moulds to the other support which then deposits them, turned by 180°, on the conveyor carrying the wrapping means.

Such a mechanism is relatively complicated and the invention aims to supply a simpler device enabling operation at higher speeds.

The device according to the invention is characterized in that it comprises tubular arms carrying the cup supports mounted rotatably and diametrally opposite on a hollow fixed shaft, means for driving said arms in synchronization with the production machine in the suction zone, first cam means driven with said arms to impart to the cup supports an angular correction determined with a view to facilitating unmoulding of the products, and second cam means driven with said arms to move said arms parallel to the fixed shaft during their rotation with a view to regulating the spacing of the products which after having been sucked out of the moulds by one of the arms are turned by 180° to arrive on said table.

The accompanying drawings show, by way of example, an embodiment of the device according to the invention. In the drawings:

FIG. 1 is a cross-section, to an enlarged scale, along line I—I of FIG. 2;

FIGS. 2 and 2a are two parts of axial cross-sections of the device shown along line 2—1 and along line 2a—2a of FIG. 3;

FIG. 5 is a plan view of FIG. 4 to a smaller scale.

Figure 1:
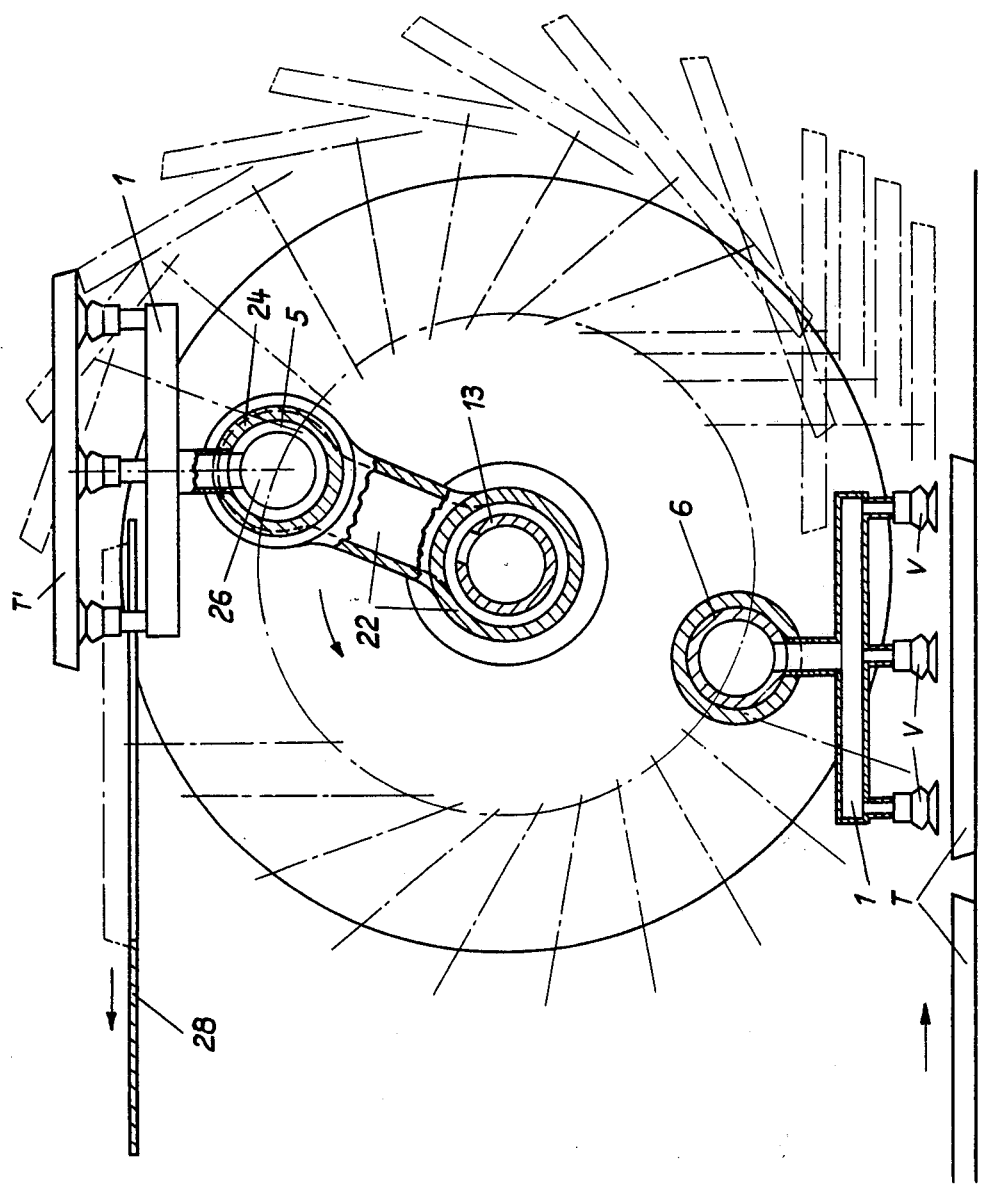

The device shown serves for the transfer of bars T of chocolate from moulds (not shown) of a production machine, to a table 28 of a wrapping machine, where these bars are designated by T'. This device comprises suction cups V mounted on tubular supports 1 connected to a vacuum source or a pump.

The cup-supports 1 are carried by tubular extensions of shafts 5, 6, these shafts and tubular extensions being mounted on tubular arms 22, 22' (FIG. 2, 2a) which project diametrally opposite to one another from a hollow fixed shaft 13 on which they are rotatably mounted. The shaft 13, serving as a suction pipe, communicates via openings 27 with the interior 25, 25' of the arms 22, 22' and the bores 26 in the shafts 5 and 6 communicate with the cup-supports 1.

Figure 2:
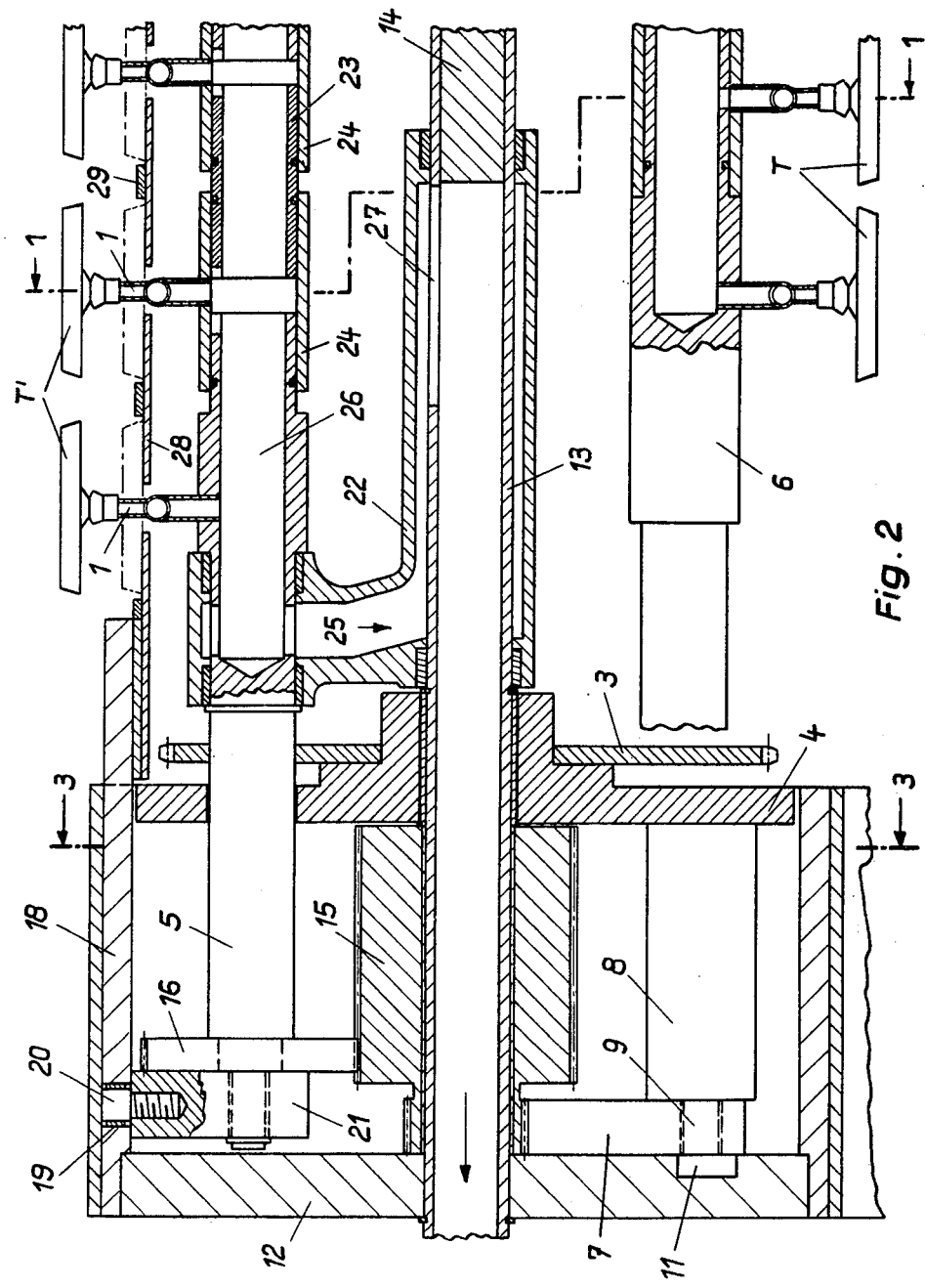
Figure 2A:
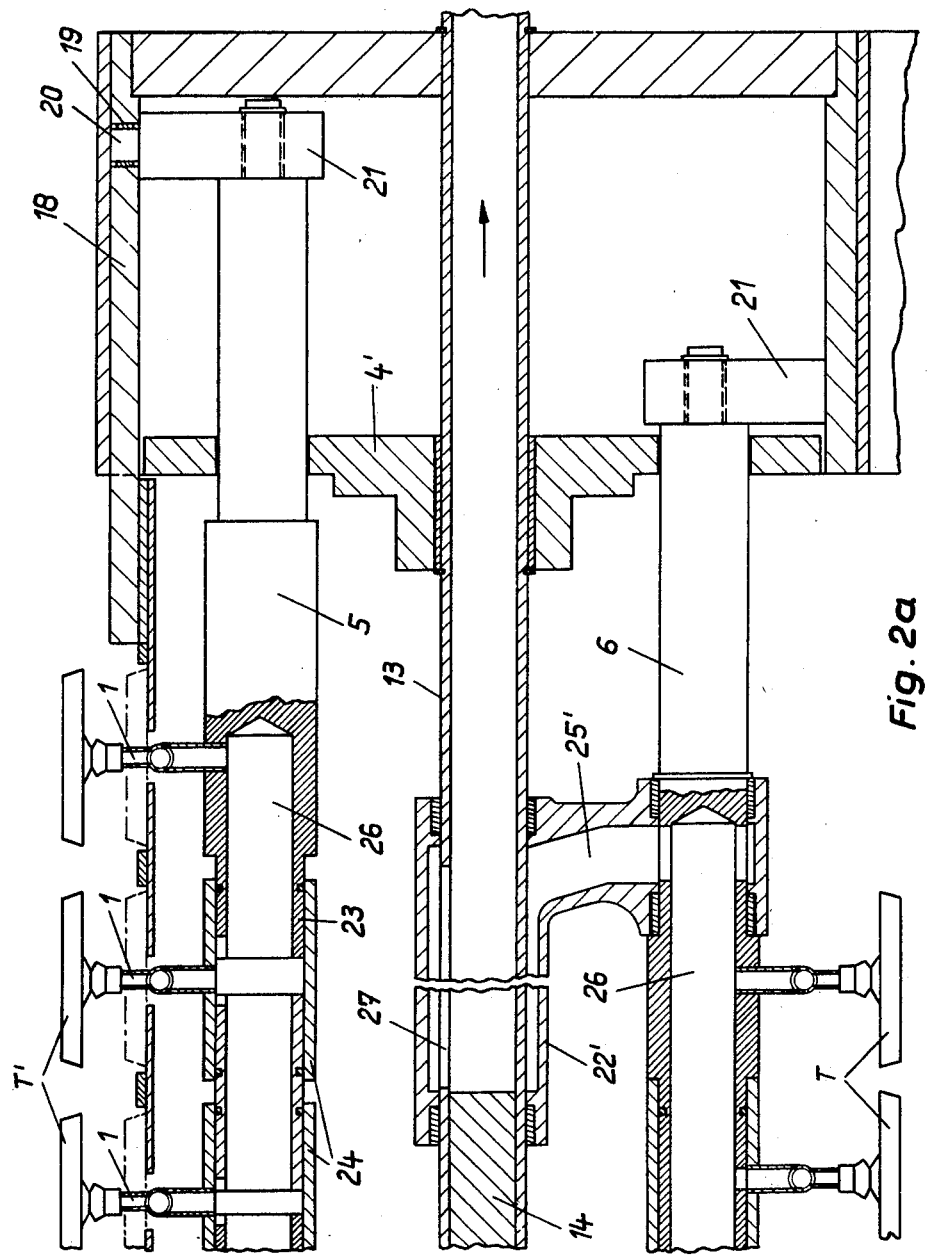
Figure 3:
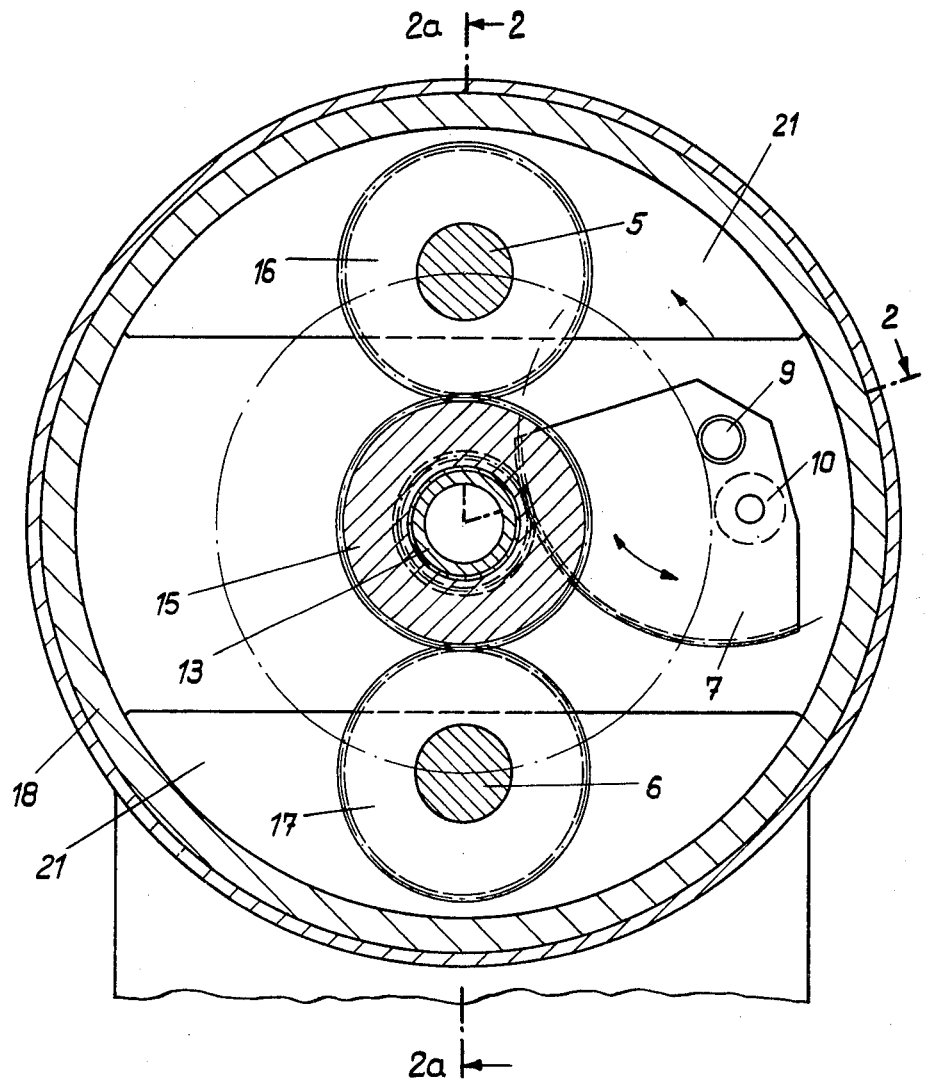
FIG. 3 is a cross-section along line 3—3 of FIG. 2.

A chainwheel 3 fixed on a disc 4 disposed towards one end of shaft 13 is driven in synchronization with the production machine (not shown). A similar disc 4' is disposed towards the other end of shaft 13 as shown in FIG. 2a, these discs 4, 4' carrying the shafts 5 and 6. At one end, shafts 5, 6 have fixedly mounted planet pinions 16, 17 respectively meshing with a sun pinion 15 turning freely on the fixed shaft 13, the sun pinion 15 having a second toothing of smaller diameter meshing with a toothed sector 7 (FIGS. 2 and 3). Disc 4 also carries a shaft 8 whose end serves as pivoting axis for toothed sector 7. A roller 10 carried by the toothed sector 7 is guided in an annular groove 11 of appropriate shape in a fixed cam 12.

Second cam means, also driven with the tubular arms 22, 22', comprise towards each end of the shafts 5 and 6 a groove 19 provided in a fixed tubular cam 18 and a roller 20 fixed on a guide sector 21 providing a coupling between the roller 20 and shafts 5 and 6. The shape of the cam-groove 19 is such that during operation of the device the roller 20 moves shafts 5 and 6 axially by the intermediary of the guide sector 21, simultaneously driving the planets 16 and 17 along the sun pinion 15. When the shaft 5 is in the position shown in FIGS. 2 and 2a, the arm 22 occupies its position closest to the chainwheel 3; at the same moment, the arm 25' occupies its position furthest away from disc 4'. The cup-supports 1 are mounted on sleeves 24 telescopically mounted on tubes 23 extending between the ends of the respective shafts 5 and 6. Sealing joints are disposed between sleeves 24 and tubes 23 to prevent air from penetrating in the bore 26 and in the tubular supports 1.

The described device comprises two suction circuits, one for each tubular arm 22, 22', the two ends of the hollow shaft 13 being connected to the vacuum source and a stopper 14 being fixed in shaft 13 to separate the two circuits.

Figure 4:
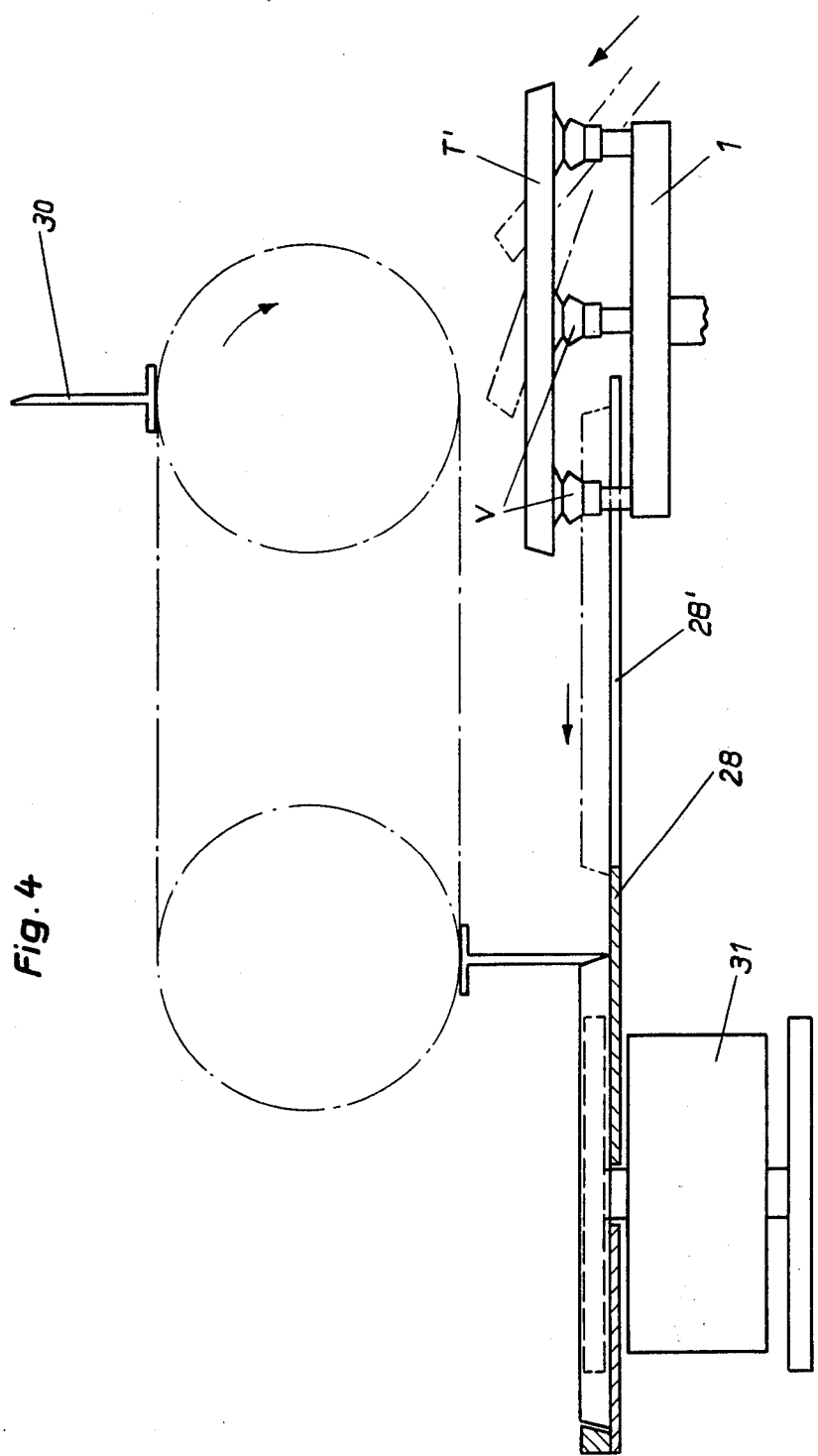
FIG. 4 is a side view of a detail of FIG. 2, to an enlarged scale.

The table 28 receiving the bars T' of chocolate has slots 28' in which the tubes connecting the supports 1 to the cups V move, and through which the cups V can pass. Between the slots 28' are disposed guide members 29 providing guiding of the bars T' between the table 28 and, for example, a transverse feeding chain 31 of a wrapping machine. The bars T' are pushed along between these guides 29 for delivery to chain 31 by an arm 30 mounted on an endless chain as shown in FIG. 4. Chain 31 may have a differential advance as described in copending application, now U.S. Pat. No. 4,019,624.

Operation of the described device is as follows:

The bars of chocolate T (or any other product) arriving in moulds, not shown, or placed on a conveyor belt (FIG. 1) in successive rows, are successively picked up by suction by the cups V of one of the two series of cup-supports 1. The arms 22, 22' carrying these supports 1 carry out a rotation of 180° whereby the bars are transferred, turned over and deposited on the table 28 as shown in FIGS. 1 and 4.

An angular correction of the suction-cup supports is carried out during the rotation of the arms 22, 22' to facilitate unmoulding of the bars of chocolate, by the intermediary of the planets 16 and 17 which are keyed on shafts 5 and 6 and turn about the sun pinion 15. This sun pinion 15 is actuated by the toothed sector 7 pivoting on the shaft 9 and controlled by the fixed cam 12 and roller 10.

The displacement of toothed sector 7 imparts a certain angular correction to the pinion 15 which transmits this correction to the planets 16, 17 and from there to the supports 1 by the shafts 5 and 6. The amplitude and the acceleration of the correction are a function of the shape of the groove 11 of cam 12.

If the driving chainwheel 3 turns at a constant speed and the sun pinion 15 held stationary, the angular speed of the planets 16 and 17 would in the illustrated example be double that of the chainwheel 3, in view of the diameter of these planets in relation to the diameter of the circle described by their shafts. However, as the sun pinion 15 is driven by sector 7, the angular speed of the planets 16 and 17 may be reduced, cancelled or even reversed, according to the angular speed of the sun pinion 15 relative to disc 4. The sector 7 controlled by the roller 10 makes the sun pinion 15 turn in one direction or the other, relative to disc 4, to produce a rotation of the planets 16 and 17 and hence an angular displacement of the shafts 5 and 6, providing a desired angular correction of the suction-cup supports 1. As shown in FIG. 1, this angular correction is such that during the initial part of the movement once the bars T have been picked up, the suction-cup supports 1 hold the bars parallel to their initial direction of feed until they are lifted out of the moulds.

The second cam means 18, 19, 20, 21 enable the spacing of the bars T or other products of one and the same row to be modified during the transfer of these bars T from the moulds onto the table 28 where they are turned by 180° as shown at T'. As the rollers 20 move in the grooves 19, the guide sectors 21 fixed on shafts 5 and 6 axially move these shafts with the planets 16 and 17 as well as the arms 22, 22' so that the telescopic assembly 23, 24 is also axially moved bringing the suction-cup supports 1 into desired positions facing the slots 28' of table 28. This table 28 is fixed and is designed for bars of a given size. If the table is replaced by another, the cam grooves 19 must be appropriately modified to correspond to the new table. Setting of the spacing of the bars of chocolate carried out by the telescopic assembly is terminated as soon as the suction-cup supports 1 enter the slots 28' of table 28.

What we claim is:

1. Apparatus for removing tablets of chocolate from their respective molds as they issue from a production machine moving horizontally in mutually spaced relationship and transferring them to horizontal conveyor in a plane different from the plane of said path comprising a hollow shaft, cup supports, tubular arms mounting said cup supports for rotation about said shaft on opposite radii thereof in a path successively intersecting the moving tablets issuing from the production machine and said conveyor, means for driving said arms in synchronism with the spacing of said tablets issuing from said machine, means responsive to the angular position of said cups to provide vacuum to them from their intersection with said tablets issuing from said machine until intersection with said conveyor so as to suck up said tablets from said molds to hold them during angular transfer and to free them as they are supported by said conveyor, first cam means driven with said arms to impart to the cup supports an angular correction with respect to the radius of said shaft, in order to keep the longitudinal axis of the suction cups in a vertical position from the beginning of said suction zone until a locus beyond said suction zone, and furthermore in order to turn said axis around an angle of 180° and keep the axis in a vertical position from the beginning of a zone where the tablets or bars are given over to said conveyor until a locus beyond said last mentioned zone, and second cam means driven with said arms to move said arms parallel to the fixed shaft during their rotation in order to control the spacing of the tablets or bars during their transfer from said molds to said conveyor.

2. A device according to claim 1, in which said driving means comprise a chainwheel fixed on a disc carrying rotatable shaft on which are fixed planet pinions, the fixed shaft carrying a rotatable sun pinion meshing with the planet pinions and having a toothing of smaller diameter meshing with a toothed sector pivoted on said disc, said first cam means comprising a first fixed cam groove cooperating with a roller carried by a toothed sector to control angular displacement of the toothed sector, and said second cam means comprising a second fixed cam groove cooperating with a roller controlling axial displacement of said rotatable shaft in response to rotation of the disc.

3. A device according to claim 1, comprising two diametrally opposed tubular arms and two suction circuits, one for each arm, the hollow fixed shaft having two ends connected to a vacuum source and a stopper fixed inside the fixed shaft to separate the two circuits.

* * * * *